(12) United States Patent
Schaefer

(10) Patent No.: US 6,246,129 B1
(45) Date of Patent: Jun. 12, 2001

(54) CONTROL STALK FOR A MOTOR VEHICLE

(75) Inventor: Peter Schaefer, Moensheim (DE)

(73) Assignee: Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/337,758

(22) Filed: Jun. 22, 1999

(30) Foreign Application Priority Data

Jul. 22, 1998 (DE) ............................................. 198 32 869

(51) Int. Cl.$^7$ ....................................................... B60L 1/00
(52) U.S. Cl. ................... 307/10.1; 200/61.27; 200/61.54
(58) Field of Search ................... 307/9.1, 10.1; 200/61.54, 61.27, 318, 323, 324, 327; 379/424; 455/297, 152.1; 701/36

(56) References Cited

U.S. PATENT DOCUMENTS

| | | | |
|---|---|---|---|
| 4,219,706 | * | 8/1980 | Koch et al. ................................ 200/4 |
| 4,723,057 | * | 2/1988 | Lane, Jr. ............................ 200/61.27 |
| 5,581,058 | * | 12/1996 | Javery et al. ............................. 200/4 |
| 5,584,052 | * | 12/1996 | Gulau et al. ............................. 455/79 |
| 5,742,014 | * | 4/1998 | Schwartz et al. ................. 200/61.27 |
| 6,020,563 | * | 2/2000 | Risk, Jr. et al. .................. 200/61.54 |
| 6,118,089 | * | 9/2000 | Stewart et al. ..................... 200/61.28 |

FOREIGN PATENT DOCUMENTS

| | | |
|---|---|---|
| 2049849 | 4/1972 | (DE) . |
| 0525301A1 | 2/1993 | (EP) . |

OTHER PUBLICATIONS

European Search Report, Nov. 5, 1999. EP 99 11 1105.

* cited by examiner

Primary Examiner—Josie Ballato
Assistant Examiner—Sharon Polk
(74) Attorney, Agent, or Firm—Crowell & Moring, L.L.P.

(57) ABSTRACT

A control stalk includes a support shaft and a head mounted on the support shaft. At least the head is rotatably mounted on the support shaft and latches in various radial switch positions. In each radial switch position, additional switch positions can be triggered by pivoting the support shaft. In order to create a control stalk that permits improved operation, especially when different devices to be operated are associated with the various radial switch positions, it is provided that at least the head be capable of being brought into a specified radial switch position by outside force. The outside force can be responsive to a telephone call.

14 Claims, 4 Drawing Sheets

CONTROL STALK FOR A MOTOR VEHICLE

BACKGROUND AND SUMMARY OF THE INVENTION

This application claims the priority of German application 198 32 869.9, filed in Germany on Jul. 22, 1998, the disclosure of which is expressly incorporated by reference herein.

The invention relates to a control stalk for a vehicle which includes a control shaft and a head rotatably mounted thereon.

A control stalk is known from German Patent Document DE-OS 20 49 849 whose head is rotatably mounted. The head can assume a plurality of radial switch positions. In addition, an axially movable switch knob is provided endwise on the head for triggering additional switch functions.

By contrast with this prior art, a goal of the invention is to provide a control stalk that permits improved operation, especially when different devices to be operated are associated with the various radial switch positions.

This goal is achieved according to preferred embodiments of the invention by providing a control stalk for a motor vehicle comprising a support shaft and a head mounted on the support shaft, with at least the head being rotatably mounted on the support shaft, with latching in various radial switch positions and with additional switch positions being triggerable in each radial switch position by pivoting of the support shaft, wherein at least the head can be brought into a specified radial switch position when actuated by outside force.

It is proposed by the invention that at least the head be actuated by outside force to assume a specified radial switch position. Advantageously, the control stalk can be moved into a specified radial switch position by an external signal, namely the outside force, independently of previously performed manual actuation by the driver.

Advantageous features of preferred embodiments of the invention are described herein and in the claims.

Thus, it is proposed in certain preferred embodiments of the invention to design a latch that holds the head in the various radial switch positions so that it can be released by outside force and also keeps the head centered at a specified radial switch position. Thus, the head on the control stalk returns to the specified radial switch position when the latch is released by an outside force, for example an electromagnet.

In addition it is proposed according to certain preferred embodiments of the invention that a device be associated with each radial switch position of the head, said device being operable in this radial switch position by the additional switch positions of the control stalk. Thus, a plurality of devices can be operated with the aid of the control stalk; by selecting the radial switch position, the device is selected and this device can then be operated by pivoting the control stalk. In conjunction with the return of the control stalk actuated by the outside force, the device associated with a specified radial switch position can always be operated following a return performed by outside force.

In addition it is proposed according to certain preferred embodiments of the invention that the device associated with the specified radial switch position control the outside force. In an advantageous manner, therefore, the device associated with the specified radial switch position can bring the control stalk into a position in which this device can be operated. This is especially advantageous when the device is a telephone for example. A telephone of this kind can bring the control stalk into a radial switch position when a call comes in, in which position the telephone can be operated and hence the incoming call can be answered regardless of the radial switch position into which the control stalk was previously brought manually by the driver.

Other objects, advantages and novel features of the present invention will become apparent from the following detailed description of the invention when considered in conjunction with the accompanying drawings.

DETAILED DESCRIPTION OF THE DRAWINGS

Figure 1:
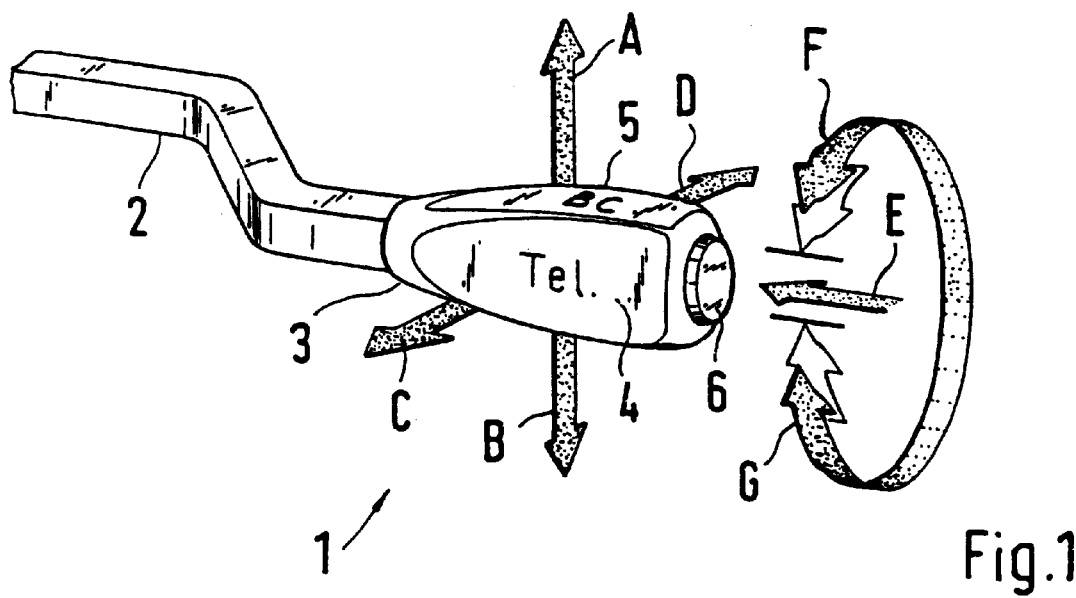
FIG. 1 is a schematic perspective view of a control stalk constructed according to a preferred embodiment of the invention.

FIG. 1 shows a control stalk 1, comprising a support shaft 2 and a head 3. In the present case, head 3 is connected pivotably with support shaft 2 around a lengthwise axis of support shaft 2, so that movements F and G are possible. Support shaft 2 is secured pivotably in a manner not shown in greater detail and permits movements A to D. The pivoting movements A and B correspond to upward and downward movements of control stalk 1, while movements C and D correspond to forward and backward movements, each relative to a driver, not shown. A knob 6 is actuated on the end of head 3 in a movement direction E.

Markings 4, 5 are provided on head 3, with the markings facing the driver (in the example shown, this is marking 4) indicating to the driver which radial switch position the head 3 is assuming at the present time. To apply markings 4, 5, they can be located on caps not shown in greater detail, said caps being clipped into head 3. In this way it is possible simply to adjust the markings on the equipment of a motor vehicle provided with control stalk 1.

Figure 2:
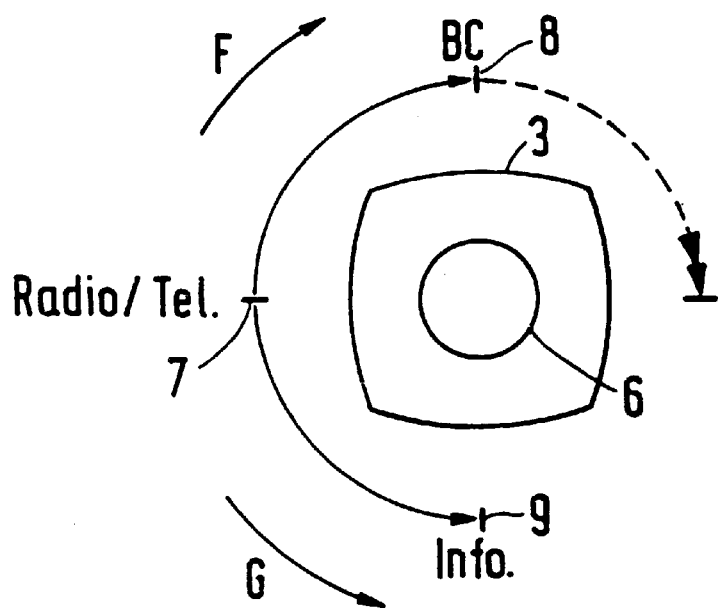
FIG. 2 is a schematic view of specified radial switch positions of the control stalk of FIG. 1 following a first application.

As shown in greater detail in FIG. 2, the operating device is associated with each of the different switch positions on head 3. Thus, in switch position 7, a telephone 24 and a radio 25 (see FIG. 5) can be operated, while an on-board computer 23 can be operated in switch position 8 and an information system 22 can be operated in switch position 9. Operation takes place in each case by movements A to E. Head 3 latches in each of switch positions 7 to 9. It is also contemplated to associate an additional not shown device shown by dashed lines in FIG. 2 with the switch position.

Figure 3:
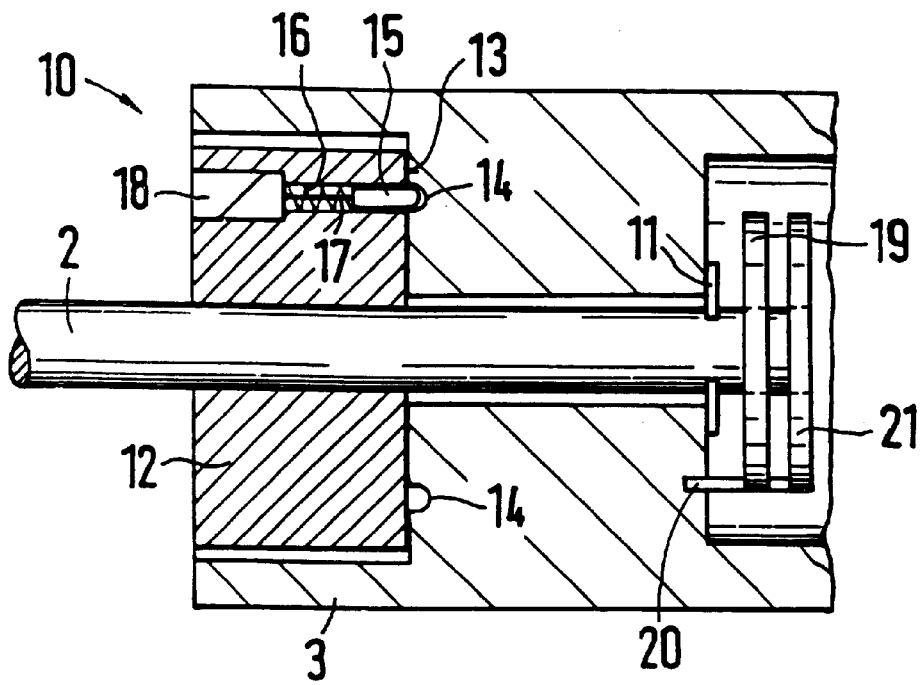
FIG. 3 is a sectional view through a latch on the control stalk of FIG. 1.
Figure 4:
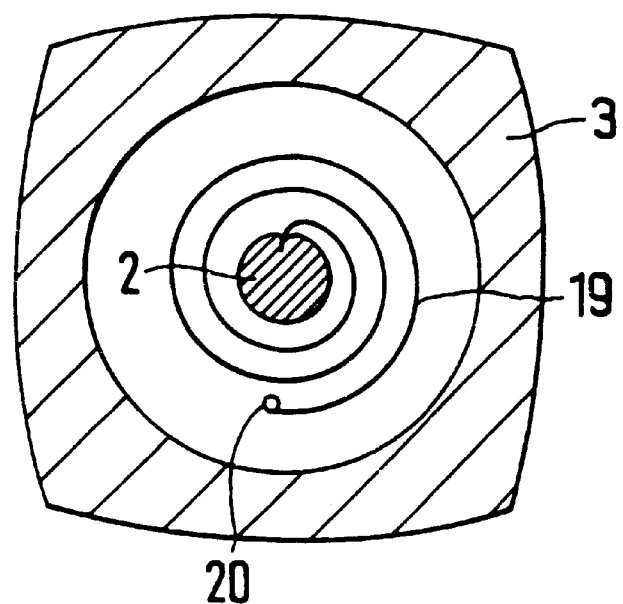
FIG. 4 is a schematic sectional view of a latch for the control stalk of FIG. 1.

In FIGS. 3 and 4, a latching device 10 used to latch head 3 is shown in greater detail. Head 3 is rotatably mounted on support shaft 2 and secured by a safety disk 11 in the axial direction. The second axial bearing for head 3 is formed by a block 12 permanently mounted on support shaft 2. In a contact plane 13 between block 12 and head 3, depressions 14 are machined into head 3, said depressions corresponding to switch positions 7 to 9. A latching pin 15 is located in block 12 to correspond to depressions 14. The pin is urged by a spring 16. At the same time, latching pin 15 is connected with a tie rod 17 of an electromagnet 18. When magnet 18 is energized, latching pin 15 is pulled against the force of spring 16 out of depression 14 by means of tie rod 17.

A rotary spring 19, located in this case behind safety disk 11, is nonrotatably mounted on support bushing 2 and engages head 3 by a pin 20. A second rotary spring 21 is likewise nonrotatably mounted on support shaft 2 and likewise engages pin 20. When latching device 10 is released, in other words when head 3 is freely rotatable, rotary springs 19, 21 assume a position in which the spring forces directed sequentially in opposite directions are released. Springs 19, 21 are designed so that this position corresponds to switch position 7 of head 3.

In other words, energization of magnet 18 has the result that head 3 is moved by the force of rotary springs 19, 21 into a specified position, in this case switch position 7. Of course it is possible in this case to use means other than rotary springs 19, 21 to restore head 3 to the specified switch position 7; for example, head 3 can also be moved by an electric motor.

Figure 5:
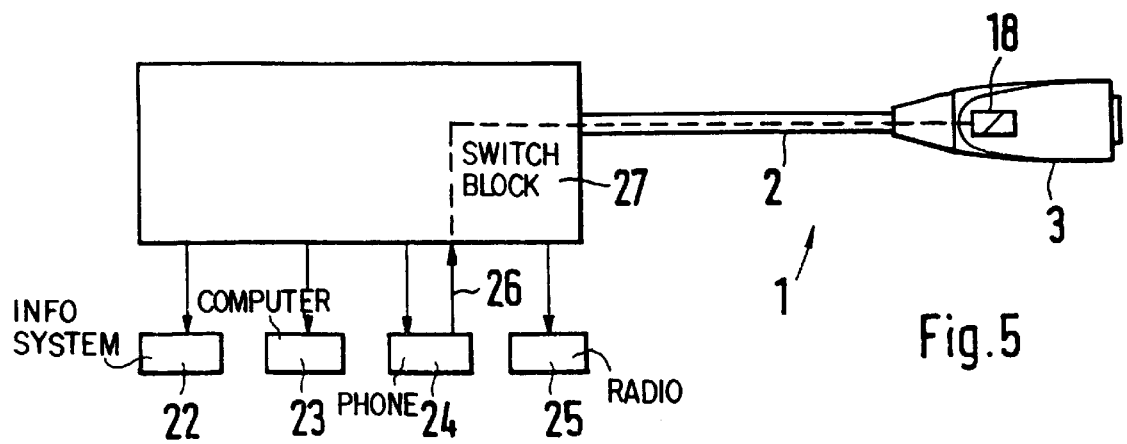
FIG. 5 is a block diagram of the control stalk of FIG. 1, depicting additional devices connected with the control stalk.

FIG. 5 shows as a block diagram, the cooperation between control stalk 1 and the associated devices, namely information system 22, on-board computer 23, telephone 24, and radio 25.

Depending on the radial switch position 6 to 9 of control stalk 1, signals I generated in a switch block 27 of control stalk 1 by the movements are passed on to one of devices 19 to 22 so that the respective device is selected by the radial switch position 6 to 9 and can be operated by the movement of control stalk 1. Telephone 24 is connected by a separate lead with lifting magnet 18. An incoming call is signaled by telephone 24 and when the driver takes the call by pressing knob 6, telephone 24 actuates lifting magnet 18 via line 26. Then the action of the latching device 10 is suspended and the rotary springs 19, 21 turn the control stalk 1 into radial switch position 7 associated with telephone 24. Thus the driver, when a call comes in, by pressing knob 6 can directly reach the switch position associated with telephone 24 without having to turn head 3 into radial switch position 7 beforehand and without having to check whether head 3 is already in radial switch position 7. For the design of the control stalk 1 shown, it would also be basically sufficient to stop the action of device 10 mechanically by coupling knob 6 with a latching device 10. However, this results in the loss of the ability to suspend the action of latching device 10 by telephone 24 and/or radio 25 at any point in time.

Figure 6:
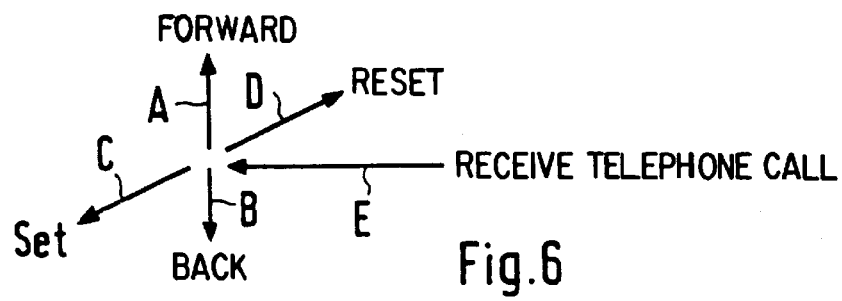
FIG. 6 is an operating diagram for an on-board computer control with the control stalk of FIGS. 1–5.
Figure 7:
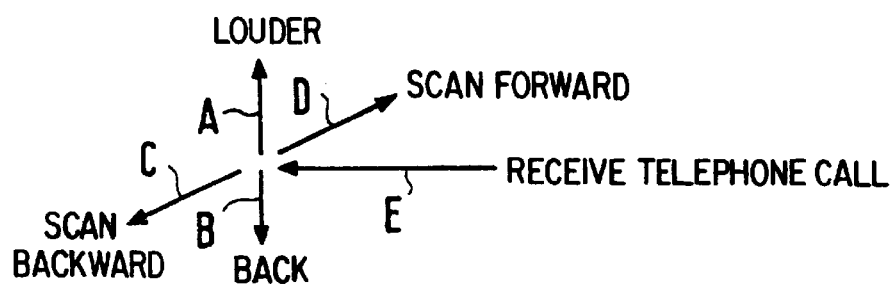
FIG. 7 is an operating diagram for a radio and a telephone control with the control stalk of FIGS. 1–5.
Figure 8:
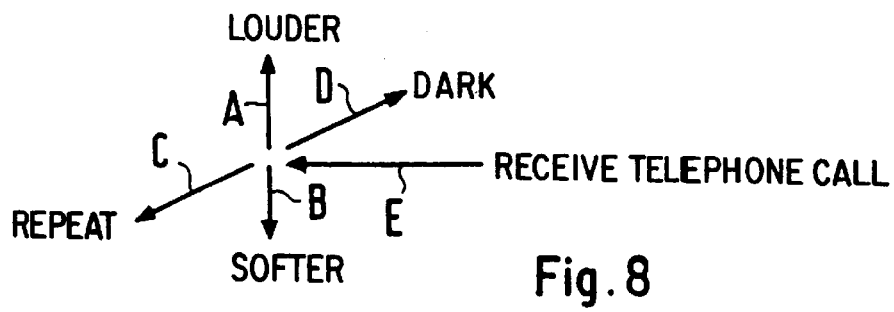
FIG. 8 is in operating diagram for an information system control with the control stalk of FIGS. 1–5.

The operation of the associated devices 22 to 25 with the aid of control stalk 1 is shown in greater detail in FIGS. 6 to 8.

FIG. 6 shows the operation of on-board computer 23 in switch position 8. By movements in directions A and B, various readings (outside temperature, remaining distance to be traveled, average speed, etc.) of on-board computer 23 are selected. Movement direction A selects the next reading and movement direction B selects the previous reading. If this is provided for the reading shown, the movement direction D can result in a reset to zero or a value can be set in advance by movement direction C.

By pressing knob (6) in movement direction E, an incoming telephone call can be taken at any time and head 3 can be turned to radial switch position 7.

Operation of telephone 24 and radio 25 in switch position 7 is shown in FIG. 7. Movement directions A through D are Initially provided for operating the radio; the volume is increased in movement direction A, reduced in movement direction B. Movement direction C triggers a station search toward lower frequencies, while movement direction D triggers a station search toward higher frequencies. On the other hand, when the telephone has been activated, radio 25 is muted; movement directions A and B are then used to control the volume of telephone 24, with operation proceeding similarly to the control of the volume of radio 25.

An incoming call can be taken by pressing button 6. In addition, in this switch position 7, an outgoing call can be triggered by pushing button 6. In this case, a telephone number must be entered previously by means of a separate keypad, not shown, or selected from a memory, likewise not shown. This number is then dialed by pushing button 6 and the connection is made.

If telephone 24 is activated by button 6 (taking a call, outgoing call), it is muted by activating radio 25. As long as telephone 24 is activated, the volume of telephone 24 is adjusted by movement directions A and B. On the other hand, if radio 25 has been activated, movement directions A and B serve to adjust the volume of the radio. The volume setting is stored separately for radio 25 and telephone 24.

Finally, FIG. 8 shows the operation of information system 22. By means of movement directions A and B, the volume of speech output can be increased or decreased. With movement in direction C, the last message can be repeated. In movement direction D, a display, not shown in greater detail, on the information system can be dimmed, especially to reduce blinding when driving at night.

In this switch position 9 as well, an incoming telephone call can be taken and head 3 can be turned to radial switch position 7.

Figure 9:
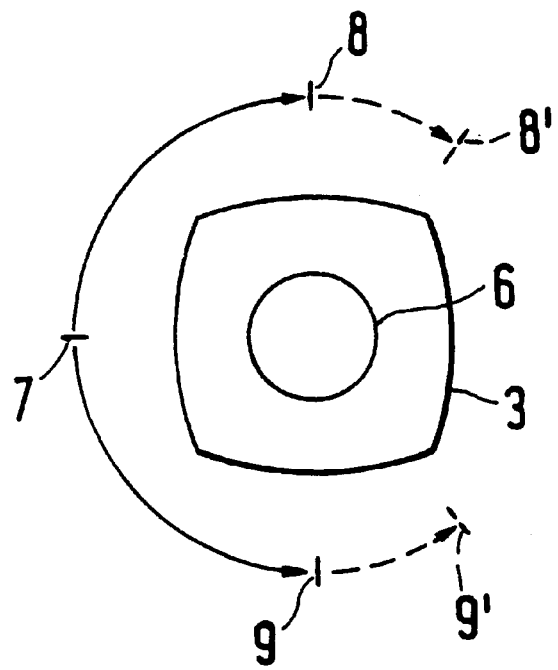
FIG. 9 is a view of specified radial switch positions of the control stalk following a second application in conjunction with a cruise-control system regulated by distance.
Figure 10:
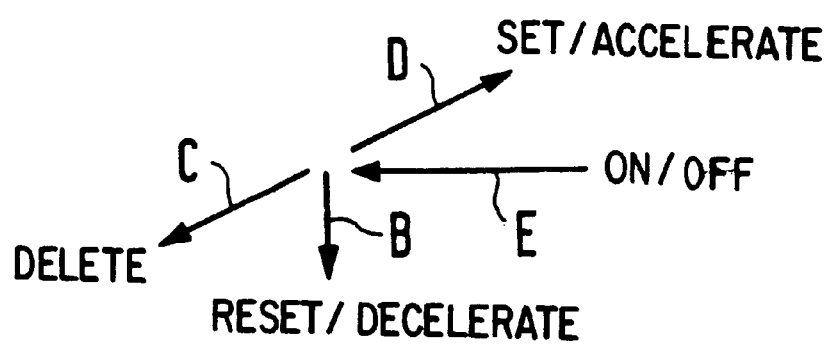
FIG. 10 is an operating diagram for the system as depicted in FIG. 9.

FIGS. 9 and 10 show, as an additional application example of control stalk 1, an application in conjunction with a proximity-regulated cruise-control system. A proximity-regulated cruise-control system is basically a device for regulation of the vehicle to a speed previously set by the driver. The term "proximity-regulated" in this connection means that in addition the proximity to a vehicle traveling ahead in the same lane is also taken into account. For this purpose, the distance from the leading vehicle is determined. If this distance is found to be below a predetermined, preferably speed-dependent value, proximity regulation replaces speed regulation so that the driver's own vehicle follows the leading vehicle at a distance specified by the system. Instead of proximity regulation, speed regulation is restored when the previously set speed is reached. A control stalk 1 used to operate such a proximity-regulated cruise-control system can additionally be provided on another control stalk 1 with which various devices on the vehicle can be operated as described in the case of the first embodiment.

FIG. 9 shows switch positions 7 to 9 as well as 8' and 9' for a control stalk 1 used in this fashion. In switch position 7 the cruise-control system associated with control stalk 1 is in its basic state, in other words an initial distance from the leading vehicle is set. This initial distance preferably corresponds to the minimum distance prescribed by law. By turning the knob to switch position 8, the driver can set a distance that is less than the initial distance. In switch position 9 he can set a distance that is much greater than the initial distance.

Additional switch positions 8' and 9' can be selected from switch positions 8 and 9 in which however head 9 does not latch. In other words, in order to select switch positions 8' and 9', head 3 must be held by the driver; if the driver releases head 3, it returns to switch positions 8 and 9. It is also possible to provide only switch positions 8' and 9' in which head 3 does not latch; head 3 is then returned to switch position 7 after actuation.

In switch position 8', the distance from the leading vehicle can be reduced continuously, in other words as long as head 3 is held in switch position 8', the distance from the leading vehicle will be continuously reduced at a low rate of change. By releasing head 3 and returning to switch position 8, the distance reduced in this fashion is maintained. Starting with switch position 8, the distance can be reduced further by again selecting switch position 8'. Similarly, the distance to the leading vehicle can be increased continuously in switch position 9'.

Alternatively, the distance from the leading vehicle can be reduced in stages in switch position 8', for example in a range from 10 percent to 30 percent of the distance. With each selection of switch position 8', the distance from the leading vehicle is reduced by one step. Even after head 3 has returned to switch position 8, the distance reduced in this fashion is maintained. By again selecting switch position 8', the distance can be reduced further by one additional step. In similar fashion, the distance from the leading vehicle can be increased in steps in switch position 9'.

If switch position 8' is selected from switch position 7, without the head remaining in switch position 8, the reduction of the distance begins at the initial distance and not at the near distance.

The reduced distance newly selected by using switch position 8' is stored as the new near distance for switch position 8. The same applies to the newly set increased distance obtained by selecting switch position 9'.

Switch positions B to D are used in a manner known of itself for adjusting the set speed. In switch position D, the current speed is set as the set speed and the cruise-control system is therefore activated. With the cruise-control system already activated, the vehicle is accelerated slowly, as long as the control stalk 1 is held in switch position D. Alternatively, each time switch position D is selected, the set speed is increased by a specified amount in a range from 10 percent to 30 percent. Switch position C serves to deactivate (cancel) the cruise-control system; the currently set speed is temporarily stored. By selecting switch position B, the cruise-control system can be activated again following deactivation of the cruise-control system. The previously stored set speed is used as the new set speed. If the cruise-control system is already activated, the vehicle can be decelerated by selecting switch position D for as long as switch position B is selected. Alternatively, each time switch position D is selected, the set speed is reduced by a specified amount in a range from 10 percent to 30 percent.

With the aid of button 6, corresponding to switch position E, the cruise-control system can be brought into its standby position. Switching on this standby position (pushing button 6 once) does not activate the cruise-control system; instead, the switch position D must be selected instead. Regardless of the state of the cruise-control system, the cruise-control system can be switched off completely by pushing button 6 once again. At the same time, magnet 18 is energized so that head 3 returns to its resting position, namely switch position 7.

When the standby position is switched off by pressing button 6, the previously stored set speed as well as all of the reset and stored distances are deleted. This measure ensures that when the cruise-control system is switched off, permanently stored initial values can be restored so that the driver, when he turns on the cruise-control system again using button 6, will not be surprised by previously arbitrarily selected settings. Alternatively it is possible to perform the deletion when the vehicle is parked; the stored values are then retained until the next time the vehicle is parked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Control stalk assembly for a motor vehicle which has a plurality of independently operating devices, said control stalk assembly comprising:
    a support shaft,
    a head rotatably mounted on the support shaft to be manually movable between respective rotative positions corresponding to respective ones of the operating devices,
    a latch mechanism operable to rotatably latch the head in a respective selected rotated position on the support shaft,
    a device condition signal generator for automatically triggering release of the latch mechanism in response to a predetermined operating device generated outside force and independent of an existing manually set position, and
    a control spring assembly operable to return the head to a predetermined radial position in response to release of the latch mechanism.

2. Control stalk assembly according to claim 1, wherein said predetermined operating device is a telephone, and said signal generated by the signal generator is generated as a function of sending or receiving a telephone call.

3. Control stalk assembly according to claim 2, wherein the support shaft is pivotably supported for manual movement between respective support shaft control positions.

4. Control stalk assembly according to claim 3, wherein the spring assembly includes a pair of coil springs fixed to the head and the support shaft and operable in respective opposite rotational directions to resiliently bias the head toward the predetermined radial position.

5. Control stalk assembly according to claim 2, wherein operation of a respective operating device is associated with each radial switch position of the head, and
    wherein the associated respective operating device can be operated in this radial switch position with additional switch positions.

6. Control stalk assembly according to claim 5, wherein the spring assembly includes a pair of coil springs fixed to the head and the support shaft and operable in respective opposite rotational directions to resiliently bias the head toward the predetermined radial position.

7. Control stalk assembly according to claim 2, wherein the spring assembly includes a pair of coil springs fixed to the head and the support shaft and operable in respective opposite rotational directions to resiliently bias the head toward the predetermined radial position.

8. Control stalk assembly according to claim 1, wherein the support shaft is pivotably supported for manual movement between respective support shaft control positions.

9. Control stalk assembly according to claim 8, wherein operation of a respective operating device is associated with each radial switch position of the head, and wherein the associated respective operating device can be operated in this radial switch position with additional switch positions.

10. Control stalk assembly according to claim 9, wherein the spring assembly includes a pair of coil springs fixed to the head and the support shaft and operable in respective opposite rotational directions to resiliently bias the head toward the predetermined radial position.

11. Control stalk assembly according to claim 8, wherein the spring assembly includes a pair of coil springs fixed to the head and the support shaft and operable in respective opposite rotational directions to resiliently bias the head toward the predetermined radial position.

12. Control stalk assembly according to claim 1, wherein operation of a respective operating device is associated with each radial switch position of the head, and wherein the associated respective operating device can be operated in this radial switch position with additional switch positions.

13. Control stalk assembly according to claim 12, wherein the spring assembly includes a pair of coil springs fixed to the head and the support shaft and operable in respective opposite rotational directions to resiliently bias the head toward the predetermined radial position.

14. Control stalk assembly according to claim 1, wherein the spring assembly includes a pair of coil springs fixed to the head and the support shaft and operable in respective opposite rotational directions to resiliently bias the head toward the predetermined radial position.

* * * * *